United States Patent
Irmatov et al.

(10) Patent No.: US 9,367,730 B2
(45) Date of Patent: Jun. 14, 2016

(54) METHOD AND SYSTEM FOR AUTOMATED FACE DETECTION AND RECOGNITION

(75) Inventors: Anwar Adkhamovich Irmatov, Moscow (RU); Peter Valerievich Bazanov, Moscow (RU); Dmitry Yurievich Buryak, Moscow (RU); Victor Dmitrievich Kuznetsov, Moscow (RU); Wang-Jin Mun, Seoul (KR); Hae-Kwang Yang, Gyeonggi-do (KR); Yong-Jin Lee, Seoul (KR)

(73) Assignee: S1 Corporation (KR)

( * ) Notice: Subject to any disclaimer, the term of this patent is extended or adjusted under 35 U.S.C. 154(b) by 2255 days.

(21) Appl. No.: 11/971,008

(22) Filed: Jan. 8, 2008

(65) Prior Publication Data

US 2016/0086015 A1    Mar. 24, 2016

(30) Foreign Application Priority Data

Jan. 9, 2007   (RU) ................................ 2007102021

(51) Int. Cl.
| | |
|---|---|
| G06K 9/00 | (2006.01) |
| H04N 7/18 | (2006.01) |
| G06T 7/00 | (2006.01) |
| G06K 9/62 | (2006.01) |

(52) U.S. Cl.
CPC ........ *G06K 9/00281* (2013.01); *G06K 9/00255* (2013.01); *G06K 9/00288* (2013.01); *G06K 9/6257* (2013.01); *G06T 7/0042* (2013.01); *H04N 7/183* (2013.01); *G06T 2207/30201* (2013.01)

(58) Field of Classification Search
None
See application file for complete search history.

(56) References Cited

U.S. PATENT DOCUMENTS

| 6,826,300 B2 | 11/2004 | Liu et al. |
| 7,031,499 B2 | 4/2006 | Viola et al. |
| 2008/0298644 A1* | 12/2008 | Irmatov ............. G06K 9/00221 382/118 |

FOREIGN PATENT DOCUMENTS

| RU | 2006118145 | 12/2007 |
| RU | 2006118146 | 12/2007 |

* cited by examiner

*Primary Examiner* — Stephen R Koziol
*Assistant Examiner* — Amandeep Saini
(74) *Attorney, Agent, or Firm* — Schwegman Lundberg & Woessner, P.A.

(57) ABSTRACT

The present invention relates to a figure recognition system and method for automatic detection, tracking and recognition of a human face image. 2D image data in the surveillance zone are remotely collected by using an optical sensor, the faces of all persons in the surveillance zone are detected, and corresponding positions are determined. The face is detected, the detected face's feature coordinate is estimated, and the detected face and the feature are tracked in the next frame while processing the video sequence. Image quality of each detected face is determined according to parameters of focus, brightness, contrast, and the presence of glasses. Recognition methods stored in the repository for each detected face are adjusted by considering the face image quality computation value, and a biometric feature set is generated by using the recognition method selected for each detected face. The figure is recognized according to the watch list by using the biometric feature generated by comparing each detected face and a template set stored in the database. A new user registration process is performed and the recognition method is adapted automatically by considering the watch list.

12 Claims, 3 Drawing Sheets

METHOD AND SYSTEM FOR AUTOMATED FACE DETECTION AND RECOGNITION

BACKGROUND OF THE INVENTION (a) Field of the Invention

The present invention relates to a biometric figure recognition system and method using a watch list, for performing adaptive figure recognition in consideration of figure features provided in the watch list, and detecting and tracking a subject such as a face in a complex scene in a place where a great volume of people gather together.

(b) Description of the Related Art

Regarding security systems including the well-known biometric system, the methods and systems for acquiring security include the following skills so as to improve system precision, reliability, and adaptivity.

Ambush video observation

Detect persons in an observation area

Track subject movement

Adaptively select figure recognition methods for a predetermined watch list based on template image characteristic For example, the Russia Federation Application No. 2006118145 discloses a method for designing a figure detection system with adaptivity for a complex scene. It improves the productivity level of the face detection system and the adaptive level of the scene item difficulty, and enlarges application fields of the biometric figure identification system to scenes having high item difficulties. Also, the above-noted skill optimizes stability and detection speed according to the characteristic of predetermined scenes. A similarity coefficient with persons is estimated based on the image quality estimation method, which improves poor quality images and eliminates figures with a bad lighting state to thus improve the figure recognition level. However, the skill does not estimate the image quality in detail and has an insufficient adaptivity level for characteristics of a predetermined watch list.

Russia Federation Application No. 2006118146 discloses a method for integrating a camera and lighting automatic control so as to detect the subject, track the subject, estimate the image quality of the detected subject, restore the subject image using 3D scene remodeling, and improve the captured and processed subject image. The skill is image quality estimation according to parameter spectrum, image quality improvement, and figure recognition according to the image quality estimation. However, the skill does not provide a method for recognizing predetermined watch list characteristics.

U.S. Pat. No. 6,826,300 discloses a method for measuring proximity between a template image and a corresponding image. This method suggests substantial face image characteristics based on the Gabor wavelet standard. The method selects an important valid shape of the face image based on the PCA (Principal Component Analysis) and LDA (Linear Discriminant Analysis) method, and estimates the proximity according to one of the Mahalanobis estimation and cosine estimation. However, the proximity estimation method does not consider data characteristics and is not adapted to the template image of the watch list.

U.S. Pat. No. 7,031,499 is a subject recognition system that recognizes a subject type from an image gallery based on a filter set and a divider amplification method, and hence cascade weights of dividers are adaptively generated and detection tasks for various subject types can be solved. However, the skill cannot adaptively select the recognition method according to the characteristics of a predetermined watch list.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to improve operational precision and stability for an intelligent video monitoring system and a biometric system based on various 3-dimensional (3D) scenes and various image databases (e.g., various watch lists and training samples.)

To solve the problem, a new method and system for analyzing a watch list image according to a watch list characteristic and adaptively controlling the method will be described. In the figure recognition biometric system, face automatic detection, tracking, and recognition will be performed as follows.

2D image data on the monitoring area is remotely collected by applying an optical sensor.

The faces of all persons staying in the monitoring area are detected and a position is established.

The face as well as the eyes and the lips are detected and a coordinate of the found face feature is estimated.

The tracking is performed, and figures whose features are detected are delivered to the next frame process.

Image quality for the detected faces is estimated according to parameters including the focus, brightness, contrast, and glasses wearing state.

A recognition mode stored in the repository is established for each checked face in consideration of the face image quality value.

A biometric feature set for each detected face is formed by using the selected recognition method.

Each detected face is compared with a template set stored in the database, and the figure is identified according to the watch list by using the formed biometric features.

After a new user registration process is performed, automatic adaptation of recognition method is performed by considering the watch list.

Also, a new system for achieving the technical object according to an exemplary embodiment of the present invention includes the following elements.

A remote collection device (e.g., 2D image) collects data for showing monitoring area characteristics by using an optical sensor.

A figure detection and tracking device performs initial detection, forms a tracking list, and performs tracking, and includes a figure detection block and a figure feature detector for eyes and lips. The device displays the coordinate of the detected feature, and generates the figure's original image area list.

A figure image quality estimation device transmits the value designated to the selection device for recognition method and estimates parameters for the respective detected figures' images. The configuration of the device includes a block for estimating image features including focus, brightness, and contrast, and a block for estimating the detected face quality (the existence state of outer things such as the glasses and eye image quality).

The selection device for recognition method performs a recognition process by selecting the best data for fragments based on the detected face image quality estimation. The device includes a repository for storing the methods for performing efficient recognition under various conditions and a block for performing functions of corresponding devices.

A watch list adaptation device performs a recognition method adjustment process from the repository based on the registered user's template analysis.

A biometric characteristic formation device forms a vector with a biometric features for processing the detected face and transmitting the process result to the recognition device. The device includes an input image preprocessing block for eliminating noise and solving an image feature distinguishing task and a coding block for concisely providing input data.

A figure recognition device selects the vector that is the most adjacent to figure image coding from the template watch list. The device includes a block for calculating similar values between the standard and current vectors, and a block for combining the values that are acquired for measuring similarity generalization.

A database management system (DBMS) stores the template that is acquired by the registration process result, generates the data acquired according to the accessible distance, direction, and representativeness into clusters, accesses the figure recognition device, and adapts to the watch list according to the template and the feature in consideration of the clusters.

The method and the system automate the process for biometrically identifying the figures according to the watch list, detecting the face of the person who stays in the detection area, and selecting the position.

<Intelligent Video Monitoring>:
the automatic collection of information about the two-dimensional images, which characterize surveillance zone
Quickly detect and track the face
Calculate quality estimation of the detected face image
Find face elements and measure biometric features <Biometric Figure Identification>:
Extract and store the user's biometric features and generate the standards of the signature for indicating the user's uniqueness.
Search figure according to the watch list and identify the figure (e.g., match the figure with the face of the database of criminals on the most wanted list)

Therefore, the embodiment of the present invention has the following features.
Detecting and tracking the face under the complex condition with image noise, non-uniform lighting, shade, and flare
Detecting the face and determining the positions of face elements under the condition with the great slope and rotary angle of a human head
Recognizing the face with high precision under the condition with noise, shade, and extraneous factors (e.g., glasses)
Identifying the face according to the watch list (a desired figure list)

DETAILED DESCRIPTION OF THE EMBODIMENTS

The exemplary embodiment of the present invention provides a new skill for solving the subsequent objects.

A previous automatic control on a detailed watch list by a recognition system may include selection of an image processing method and modification of a recognition determination choice rule.

A quality estimation algorithm for a partial image of a figure can be used so as to determine recognition possibility and automatically select a recognition method that is the most efficient for a predetermined condition.

Efficient determination rule design based on a combination of distinguishable features of a figure that is not influenced by a camera angle, a lighting condition, noise, and existence of an extraneous factor.

The present invention represents a method and system for automatically detecting, tracking, and adaptively recognizing a figure by using an identification mode according to a watch list, which will be described with reference to drawings.

Figure 1:
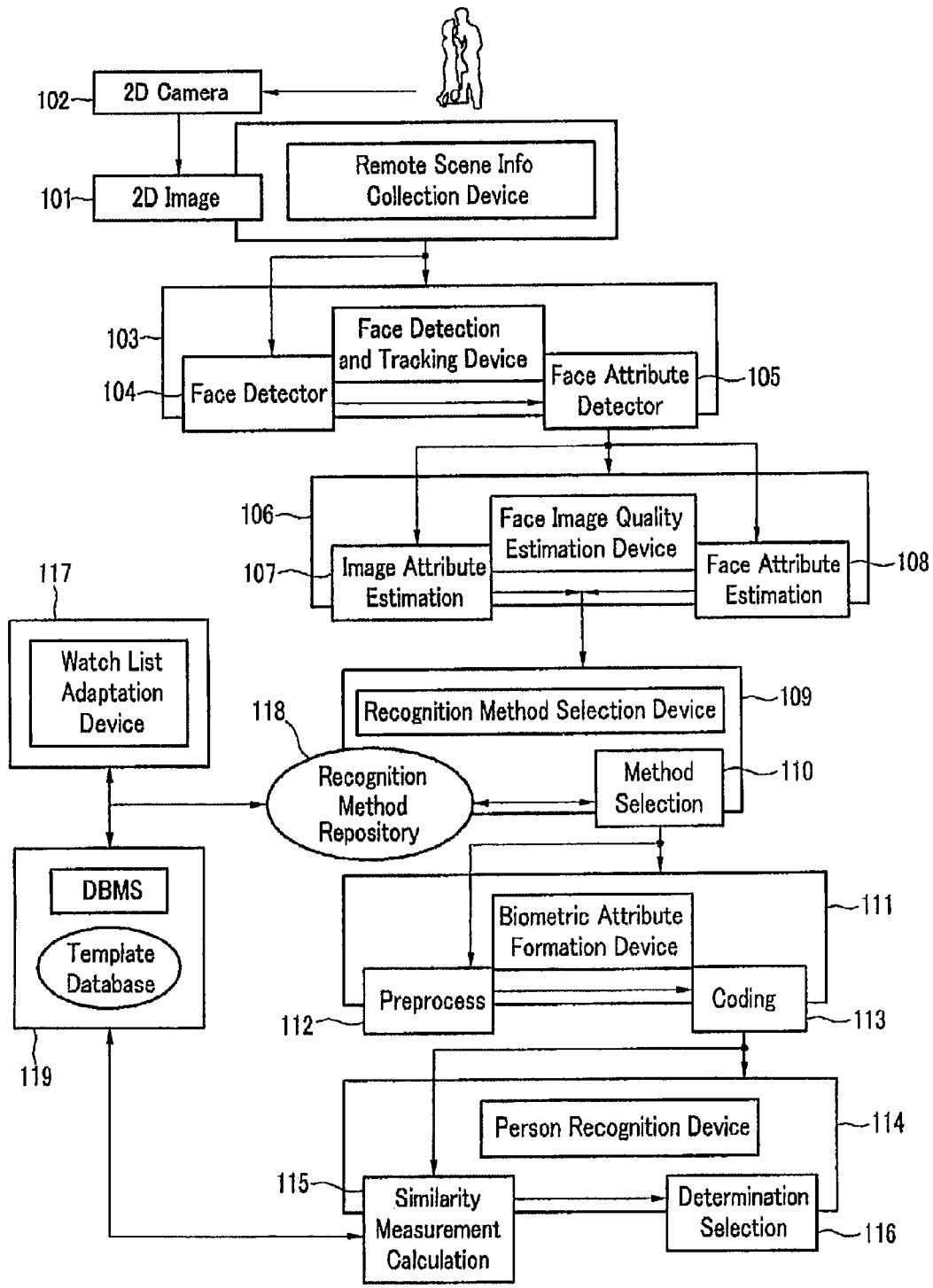
FIG. 1 is a schematic diagram for a figure recognition system according to an exemplary embodiment of the present invention.

FIG. 1 shows communication of various constituent elements for a detection, normalization, recognition, and determination choice system and individual devices.

Figure 2:
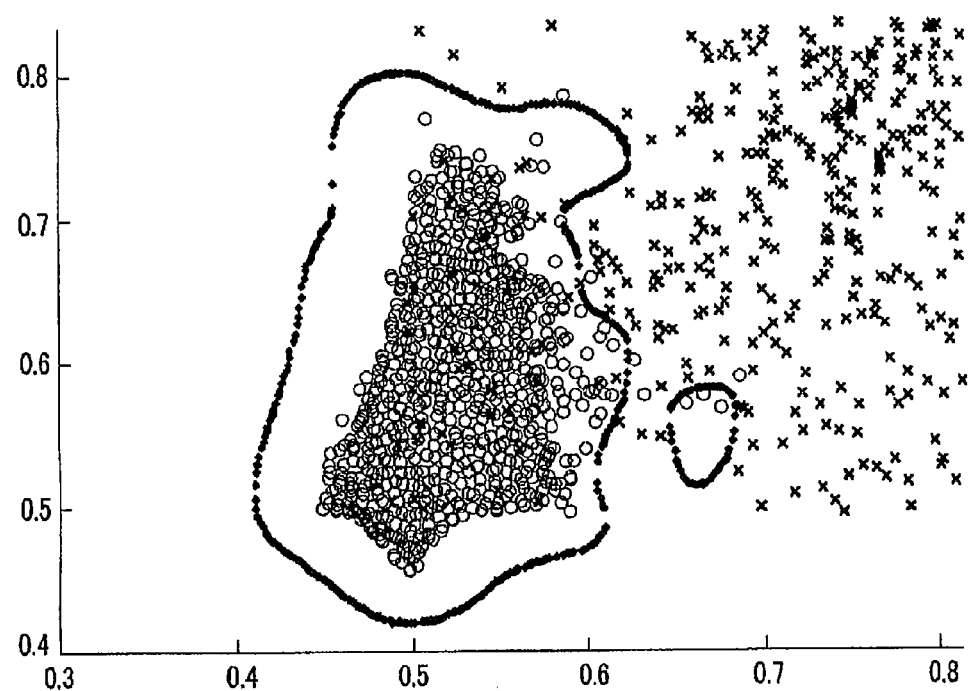
FIG. 2 is a data classification rule using an SVM according to an exemplary embodiment of the present invention.

FIG. 2 shows a data classification rule using an SVM.

Figure 3:
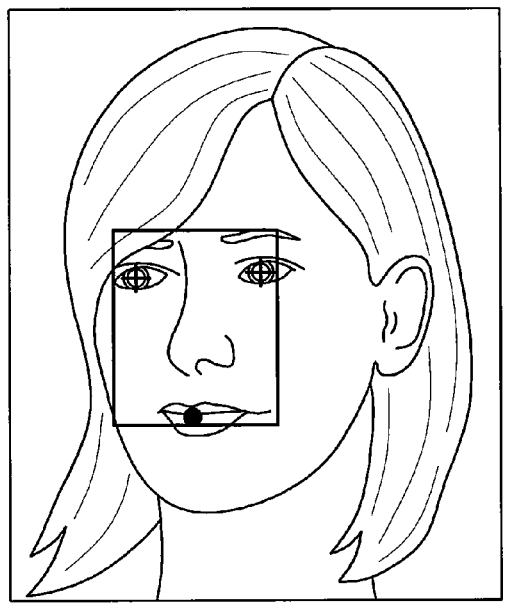
FIG. 3 is an operational result of the device for detection of face and features.

FIG. 3 shows an operational result for the detection device for face and features.

Figure 4:
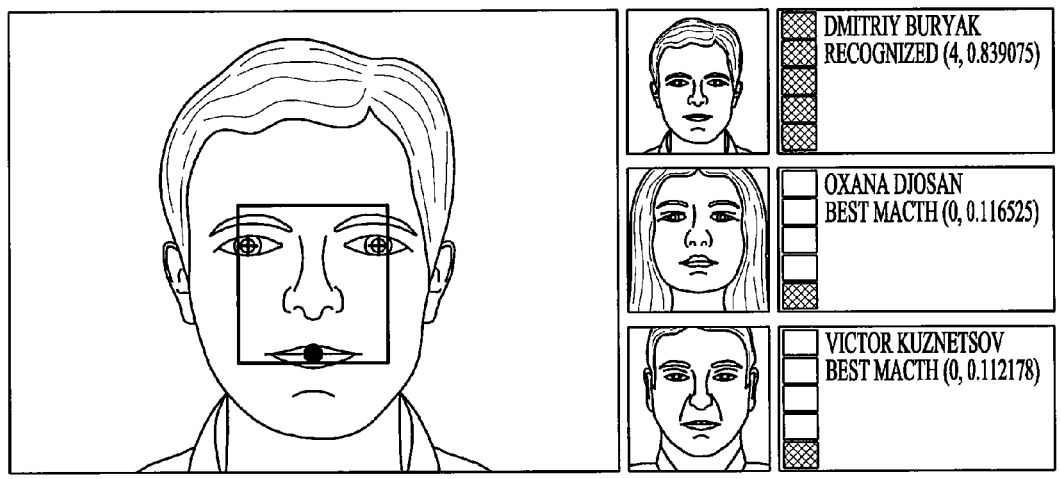
FIG. 4 is an operational result for a biometric features formation and figure recognition device.

FIG. 4 shows an operational result for a biometric features formation and figure recognition device.

As shown in FIG. 1, an image 101 is captured by using a 2D camera 102, and is transmitted to a face detection and tracking device 103. A face detection block 104 and a face features detection block 105 function as a detection mode or a tracking mode according to a real-time state of the device. The basic part of the algorithm of the face detection block 104 includes a 2-stage detection method. The first stage is a step for determining a position on which the face is provided, and in detail, a Gabor filtering process is performed and a prepared face model and an obtained maps are compared. The second stage is a step for verifying an acquired hypothesis by using a neural network having the architecture of SNoW. An updated position and a size of the rectangle including the figure are acquired from the input image according to the result of the $2^{nd}$ stage operation.

A parameter of the found rectangle area is transmitted to the face features detection block 105 for detecting the eyes and the lips of a person. An eye detection algorithm uses a brightness stage model of a person's eyes. A lip detection algorithm can filter the position at which lips may be provided by using a neural network having the architecture of SNoW. The position having the greatest reactivity is determined as the center of the lips.

The data input to the face image quality estimation device 106 include the above-noted parameters that are found from the face and the face features image. A device 106 can estimate two features types that determine the image quality.

Independent image features: focus, contrast, and brightness
Face features: glasses wearing state, and eye image quality An image features estimation block 107 is applied so as to estimate independent features of the image. In order to measure the focus of the image, an algorithm for measuring radio-frequency spectrum energy is used based on the condition provided by a local operator. Estimation on the brightness index is computed so as to distinguish the light-applied area and the shaded area, for which a partial maximum algorithm can be used. A comparison index is estimated and measured based on the maximum value of the comparison histogram. The data value is important so as to determine how many frames will be required for the next recognition.

Face characteristic quality is estimated by the face features estimation block 108. The face feature estimation block 108 determines whether the face image includes glasses. Here, the major reference to be temporarily used includes combined energy slopes on the nose, which are used to find points of a frame of glasses. The existence of the glasses influences selection of the next recognition algorithm.

The recognition algorithm applied to the system has been developed according to the next generalization table.

1. Preprocess images and distinguish features: manufacture contour frames
2. Briefly display the input image: convert it into a small vector
3. Classify the input vector (Determined rule)

A bank of comb filters can be used so as to preprocess the face and eye image and extract characteristics with information. The Gabor wavelet filter and the Banana wavelet filter are basic filters for the oriented bands and the targeted curves, and continuously provide signs that can be regarded as information in the image, the information being related to a curved feature and a characteristic of the image, direction, and period. Selection on the different periods, direction, and the number of curvatures is performed in a manner of substantially displaying the face features. For the purpose of optimization, a filtering mask and an acquired feature frame are generated into digital data in the integer representation. To achieve this, a nonlinear quantization process is performed on the 8-stage image feature map histogram.

The preprocessed image in the optimized concise format is achieved by the sequential application of PCA (Principal Component Analysis) and LDA (Linear Discriminant Analysis), which possesses the property of the minimization of intra-class variations with the maximization of interclass In this case, all the face images of the same person that are photographed at the different times in various conditions can be assigned as a single class. A learning stage is allocated to the recognition algorithm, during which a basis for optimally (one or a plurality of used algorithms) representing the combination of image classes in the initial image feature space can be built according to the above-noted method based on the teaching selection. The image given for acquiring a concise image during the recognition process is analyzed into spatial signs.

To classify the acquired concise image, a measured distance between the classified image and the template image is used.

The infrared measurement is proposed, which improves the classification quality of the corresponding system, compared to other general measurement methods such as the quadratic equation L2, linear equation L1, an angle cosine between vectors, and Mahalanobis distance.

The infrared measurement is expressed in Equation 1.

$$d(x, y) = \sum_i \sqrt{\lambda_i} \frac{|x_i - y_i|}{|x_i| + |y_i|},$$ (Equation 1)

Here, $\lambda_i$ is the self number of the covariance matrix in the general task of searching the self vector $Av = \Lambda Bv$ (A is a covariance matrix between classes, B is a covariance matrix within the class, and x and y are comparison vectors.)

To classify the image, provision of one or more concise images is used. In this case, the complete concise image provision includes several individual concise image provisions. The feature of each individual concise image provision includes a preprocessing method, reduced areas (face, eyes, and lips), and measurement for classification. In this instance, the same feature space is used so as to acquire concise images of various areas (e.g., concise images of the right and left eyes are acquired in the same feature space).

The final feature on the similarity of the two faces is calculated according to the similarity value of each concise image. The values are combined by applying the Support Vector Machine (SVM) and the AdaBoost.

The basic idea for applying the SVM for combining various measured similarities is given as a 2D graph in FIG. 2. In this instance, the classified format is found by two K-measuring vectors, and the K-measuring vectors specify the distance from a sample to each K class according to each concise image.

$$h1(x) = (d^1{}_1, \ldots, d^1{}_j, \ldots, d^1{}_K)$$

$$h2(x) = (d^2{}_1, \ldots, d^2{}_j, \ldots, d^2{}_K)$$ (Equation 2)

It is assumed here that the classified format belongs to the j class, and the order pairs $(d^1{}_j, d^2{}_j)$ for determining the distance to the class designated by each classifier belong to the "+" point grade, which is shown as "x" in FIG. 2.

In the two vectors, other distance order pairs indicate the "−" point, which is shown as circles. In order to classify the input shape, it is needed to be known to which one of the two classes the distance order pairs that are generated according to the classification vector belong, respectively. To identify various "+" and "−", the support vector machine having an RBF core is applied.

Linear combination of measured values for the automatic selection of the coefficient (a result of training) is generated by applying the AdaBoost in order to combine the different similar measured values.

The approach method described with reference to the recognition system has been combined. In the first stage, the input shape is classified by a controlled SVM. When the recognition result is negative, the shape is additionally checked by computing the coefficient that is generated automatically through the AdaBoost process and the measured value through linear combination.

A second combination is also allowable when the shape of the SVM belongs to one of the linear combined classes. Selection between the designated variations depends on the adjustment required for the system.

A feature of the system is to use a 2-stage adaptive recognition method.

1. Adaptation for a predetermined watch list, which is performed by a recognition algorithm adaptation device of the watch list.
2. Adaptation for a currently processed image, which is based on the data for the existence of glasses and is performed by a recognition method adjustment device.

The adaptation of recognition method in the first stage is based on the selection of an efficient filter system for the construction of a feature map. The selection of an efficient filter is performed in the training process for selecting the face that is registered to a special face set included in the watch list and the system configuration. The training process includes the following stages.

To construct a face space: one of filters is used as a preprocess. The number of spaces is selected to correspond to the number of comb filter banks.

To construct a similarity vector of the face through training selection on the respective constructed spaces: generated arrangements are processed by the Adaboost process. The task process determines the significant weights of the space and filters the space.

To select the most valuable filter: here, the selection conditions are that the weight of significance must be greater than 1%, and
the correlation value of feature map modification performed by the feature map must be less than 95%.

In the face space construction, the filter to be used is selected from among the filters that are combined into a group through the preprocess. The efficiency of an estimation filter group can be added based on the test that is performed in the classifier sample that is acquired from teaching selection.

The most efficient filter group is determined when the result of the training process is applied to the teaching selection.

The process for adapting a determining rule includes retraining the SVM for performing classification in consideration of users who are registered to the watch list, and calculating a new linear combination coefficient through the start of the AdaBoost process.

The adaptation for the current image is based on the selection according to a recognition space image quality estimate generated by a shape without glasses or a shape with glasses.

Selection for recognition determination and adaptation for the current image are preformed by the recognition method selection device 109. Input data for this process is an estimate calculated by the quality estimation device 106. A method selection block 110 included in the constituent elements of the device estimates recognition usefulness of the face image according to the focus, brightness, and contrast indexes, and determines the recognition method based on the existence data of the glasses, and a recognition method repository 118 requests to control the selected method.

A biometric features formation device 111 uses the selected recognition algorithm. A preprocess block 112 for an input image, included in the constituent elements of the device, performs the first stage of the general illustration of the above-described recognition algorithm. A coding block 113 suggests a concise input shape (the second stage of the general illustration of the recognition algorithm).

The vector acquired from the output of the coding block 113 is transmitted to the figure recognition device 114 for comparing the vector data and the record stored in a template database 119 to find the template that corresponds to the input shape or to determine that there is no such template. The device can perform the final stage in the classification of the general illustration of the recognition algorithm as described above. A similarity measurement block 115 measures the approachability between the vectors that are compared according to the above-noted reference. The value acquired through the above process is transmitted to a determination selection block 116 for combining the SVM-AdaBoost and the value.

A watch list adaptation device 117 of the recognition algorithm performs the recognition process adaptation algorithm for the registered predetermined user. It functions after the user registration process is finished, and it analyzes the registered face list and controls the preprocess and the determining rule process. Controlled algorithm parameters are transmitted to the recognition method repository 118.

The best device performance method is used in the embodiment so as to automate the conventional video monitoring system and manufacture a new-grade great service intelligent system (e.g., intelligent video monitoring for users, biometric identification according to the watch list, and criminal state recognition. The device can be realized as a board with a 2D image sensor and a device, and the constituent elements of the device board may include at least one or more signal processors.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A figure recognition method in a method for a biometric figure recognition system with a watch list to automatically detect, track, and recognize a face image of a figure, the method comprising:
   a) remotely collecting 2D data in a monitoring area by using an optical sensor;
   b) detecting faces and face features of persons in the monitoring area, and determining positions thereof;
   c) finding a person and estimating the person's features coordinate;
   d) tracking the detected faces and face features in a subsequent frame during a video sequence;
   e) estimating image quality of each detected person according to parameters of focus, brightness, contrast, and glasses wearing state;
   f) controlling recognition methods stored in a repository by considering face image quality values for the respective detected persons;
   g) forming biometric features of each detected person by using a selected recognition method;
   h) comparing each detected person and a template set stored in a database by using the formed biometric features to identify a figure according to a watch list; and
   i) registering a new user, and performing an automatic recognition method adaptation process by considering the watch list.

2. The method of claim 1, wherein the step of i) further comprises selecting a best preprocessing method by using template bases of registered users, and controlling various measurement combination methods of face image similarity, when performing an automatic recognition method adaptation process in consideration of the watch list.

3. The method of claim 2, wherein the method further comprises selecting a Gabor optical filter by applying an AdaBoost automatic process when selecting the best preprocessing method.

4. The method of claim 2, wherein
   the controlling of face image similarity measurement combination methods includes automatic generation of a new classification rule based on a SVM (Support Vector Machine), and calculation of a measured combination coefficient using the AdaBoost process.

5. The method of claim 1, wherein the controlling recognition methods is performed by consideration of the glasses existence state in processed face image.

6. The method of claim 5, wherein
   the step of controlling recognition methods further comprises applying an individual feature space that is the most efficient in recognizing a person wearing glasses so as to apply to a recognition algorithm when there are glasses.

7. The method of claim 1, wherein the identifying a figure according to a watch list further comprises applying an infrared measurement process and calculating a distance between an input shape and a template shape to identify the figure.

8. The method of claim 1, wherein the identifying a figure according to a watch list further comprises applying a plurality of feature spaces and providing a plurality of input shapes that are generated according to various fragments of a face image to identify the figure.

9. The method of claim 8, wherein the identifying a figure according to a watch list further comprises calculating infrared similarity measurement values for stored input shape images by using corresponding templates from a database, and generating general measurement values by summing the calculated values.

10. The method of claim 9, wherein the calculating infrared similarity measurement values of various images for the input shape further comprises applying linear sums of numbers sequentially acquired by using Support Vector Method and an AdaBoost algorithm.

11. The method of claim 10, wherein
when the Support Vector Method is used so as to combine the similarity measurement values,
initial vectors of the similarity measurement values are based on generating a separation curve between branches of two kinds acquired from conversion of ordered sequences, and each order sequence includes similarity values that are acquired by different recommendations for one class.

12. A figure recognition system for automatically detecting, tracking, and recognizing a face image by using a watch list, the system comprising:

a monitoring scene remote information collection device for transmitting a 2D image taken by a camera to a face detection and tracking device;

a face detection and tracking device including a face and face feature detection blocks, for searching for a face image, measuring a detected face feature position coordinate, and tracking the face that is found in a subsequent frame during a video sequence process; a face image quality estimation device including an image feature estimation block and a face feature estimation block, for computing a parameter value displayed on the face image provided by the detection device and transmitting a result to a recognition method control device;

a recognition method control device including a face recognition method repository and a method selection block, for selecting a recognition method that is the most efficient for a current face image according to a quality estimate provided by the face image quality estimation device;

a biometric feature formation device including a preprocess block and a coding block, for generating a concise face image that is processed by using the selected recognition method;

a figure recognition device including a similarity measurement calculation block and a determination selection block, and measuring similarity of various processed face images, summing acquired values, and determining a similarity between a template acquired from a database and an input shape;

a database management system for template databases of persons given in a watch list; and a watch list adaptation device for controlling a recognition algorithm based on analysis of elements and structure of the watch list.

* * * * *